United States Patent [19]

Hamada et al.

[11] 4,083,443
[45] Apr. 11, 1978

[54] MECHANISM FOR MODULATING CLUTCH ENGAGEMENT

[75] Inventors: Hideo Hamada, Yokosuka; Hirotsugu Yamaguchi; Koichi Takahashi, both of Yokohama, all of Japan

[73] Assignee: Nissan Motor Company, Limited, Japan

[21] Appl. No.: 703,420

[22] Filed: Jul. 8, 1976

[30] Foreign Application Priority Data

Jul. 10, 1975  Japan .................................. 50-84652

[51] Int. Cl.² ............................................ B60K 21/00
[52] U.S. Cl. .................... 192/91 R; 192/.075
[58] Field of Search .................. 192/91 R, .07, .075, 192/.076, .077

[56] References Cited

U.S. PATENT DOCUMENTS

| 2,086,576 | 7/1937 | Price et al. | 192/.075 |
| 2,601,626 | 6/1952 | Prather | 192/.075 |
| 3,536,176 | 10/1970 | Cappa | 192/.076 |
| 3,684,071 | 8/1972 | Wheymann | 192/3.58 |

*Primary Examiner*—Benjamin W. Wyche
*Attorney, Agent, or Firm*—Robert E. Burns; Emmanuel J. Lobato; Bruce L. Adams

[57] ABSTRACT

Clutch control comprising a first three-way valve which is automatically operated by the accelerator to effect the clutch engaging operation of a clutch control pressure differential operated motor and a second three-way valve which is automatically operated, when the clutch plates contact at a predetermined load, to terminate a relatively fast clutch engaging movement of the clutch plates. The motor is also in part controlled by a bleed valve operative to control the loading of the clutch plates as the clutch plates are moved by a clutch spring into firmer engagement with each other. The bleed valve is operative to repeatedly close and open an air bleed port in response to a signal pulse. A pulse width modulator is provided to vary the pulse width of the signal pulse.

5 Claims, 5 Drawing Figures

F I G. 1
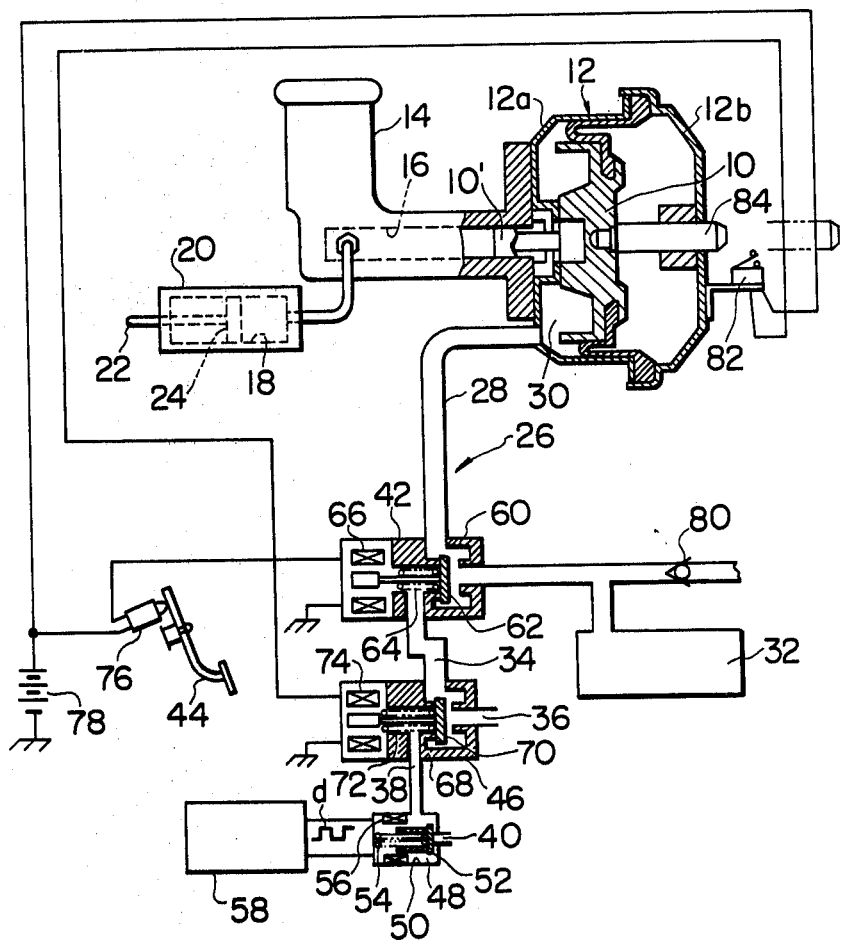

4,083,443

MECHANISM FOR MODULATING CLUTCH ENGAGEMENT

BACKGROUND OF THE INVENTION

The present invention relates in general to power operated mechanism for actuating a friction clutch in the power plant of an automotive vehicle.

SUMMARY OF THE INVENTION

According to the present invention the control means comprises a clutch control pressure differential operated motor; a source of vacuum; first means fluidly connecting the motor to the source of vacuum; second means fluidly connecting the first fluidly connecting means to a relatively large air bleed port; third means fluidly connecting the second fluidly connecting means to a relatively small air bleed port; valve means repeatedly closing and opening the relatively small air bleed port; a first three-way valve means fluidly disposed in the first and second fluidly connecting means intermediate the motor and the source of vacuum and adpated to connect the motor only to the source of vacuum when the accelerator is completely released to effect a clutch disengaging operation of the motor and to connect the motor only to the second fluidly connecting means when the accelerator is depressed to effect a clutch engaging operation of the motor; and a second three-way valve means fluidly disposed in the second and third fluidly connecting means intermediate the first three-way valve means, the relatively large air bleed port and the repeatedly closing and opening valve and adapted to connect the second fluidly connecting means only to the relatively large air bleed port to realize a relatively fast movement of the driven clutch member as it moves towards the driving clutch member and until the driven member contacts the driving member at a predetermined load and to connect the second fluidly connecting means to the repeatedly closing and opening valve means to effect a relatively small movement of the driven member as it moves into firmer engagement with the driving member.

According to a feature of the invention the above-mentioned control means comprises a pulse width modulator means to vary a pulse width of a signal pulse supplied to the repeatedly closing and opening valve means which is operated such that the duration of opening of this valve means depends on the pulse width of the signal pulse. Thus the relatively small movement of the driven clutch member can be adjusted.

BRIEF DESCRIPTION OF THE DRAWINGS

Other features of the invention and desirable details of construction will become apparent from the following description of a preferred embodiment, which description is taken in conjunction with the accompanying drawings, in which:

FIG. 1 is a diagrammatic view of a friction clutch operating means in a power plant, only the accelerator thereof being shown, of an automotive vehicle and illustrates the preferred embodiment of the invention;

DESCRIPTION OF THE PREFERRED EMBODIMENTS

Figure 2:
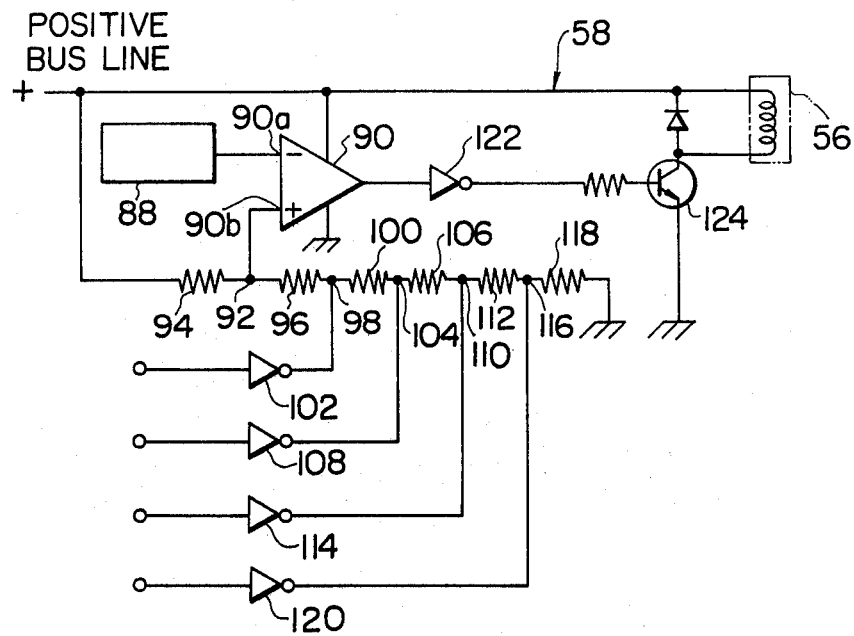
FIG. 2 is a circuit diagram showing one example of a pulse width modulator shown in FIG. 1.
Figure 3:
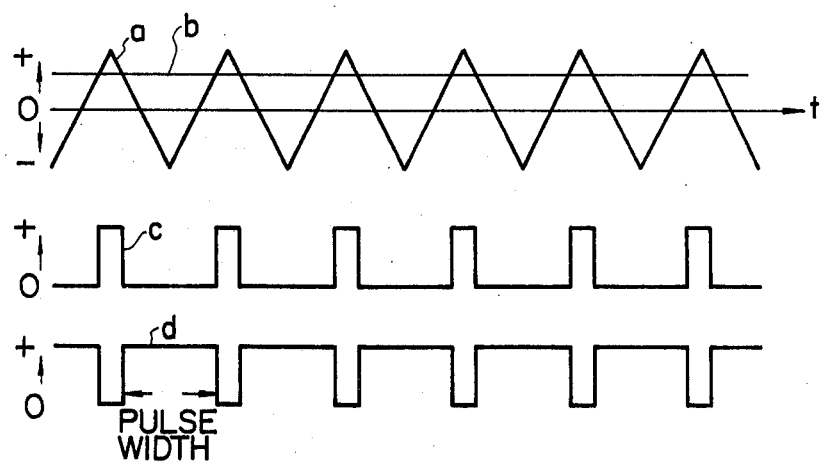
FIG. 3 is a general diagram of the output voltage of a triangular wave generator, the output voltage of a voltage divider, the output voltage of an operating amplifier, and the output voltage of an inverter.

Referring now to FIG. 1 diagrammatically disclosing a preferred embodiment of the present invention, a power element 10 of a single actuating clutch operating motor unit 12 has a piston 10' sealingly slidable in a master cylinder 14 to form a contractable chamber 16 which communicates with an expansible chamber 18 of a clutch operating cylinder 20. A power element 22 of the clutch operating cylinder 20 is operably connected to the driven element of a friction clutch (not shown). This friction clutch is of course interposed in the power plant of the vehicle between an internal combustion engine and a selective gear transmission and the engine comprises a flywheel connected to the driving member of the friction clutch. Introduction of pressurized fluid into the expansible chamber 18 displaces a piston 24 and in turn the power element 22 leftwardly, as viewed in FIG. 1, urging the driven clutch member of the aforementioned friction clutch away from the driving clutch member thereof against the bias of a clutch engaging bias means, not shown.

The friction clutch operating motor unit 12 is controlled by a valvular network 26 fluidly connected to the suction side of the motor 12. This network 26 includes a first conduit means 28 fluidly connecting the suction chamber 30 of the motor unit 12 to a source of vacuum 32, a second conduit means 34 fluidly connecting the first conduit means 28 to a relatively large air bleed port 36, and a third conduit means 38 fluidly connecting the second conduit means 34 to a relatively small air bleed port 40. The valvular network 26 also includes a three-way valve 42 which is automatically operated by the accelerator 44 to effect the clutch disengaging operation or to initiate the clutch engaging operation of the motor 12 and also includes a first stage bleed valve or a second three-way valve 46 which is automatically operated, when the clutch plates contact at a predetermined load, to terminate a relatively fast clutch engaging movement of the motor power element 10. The motor 12 is also in part controlled by a second stage bleed valve 48 which is to control the loading of the clutch plates as the clutch plates are moved by a clutch spring, not shown, into firm engagement with each other.

Describing now in detail the clutch control motor unit 12, the motor part thereof shown in section in FIG. 1, includes cup shaped casing members 12a and 12b, each provided with a flange and between the flanges there is clamped a flexible portion of the power element 10 of the motor 12.

The second stage bleed valve 48 is fluidly disposed in the third conduit means 38 to repeatedly close and open the small bleed port 40 in response to a signal pulse supplied thereto. This valve 48 has a casing 50 which forms part of the third conduit means 38 and includes, within the casing 50, a valve member 52 biased to its closed position where the small bleed port 40 is closed by a spring 54 and the power means for moving the valve member 52 toward its open position against the bias of the spring 54. The power means includes a solenoid 56 which is electrically circuited with a pulse width modulator 58.

The three-way valve 42 is fluidly disposed in the first and second conduit means 28 and 34 intermediate the motor 12 and the source of vacuum 32. This valve 42 has a casing 60 which forms part of the first conduit means 28 and the second conduit means 34 and includes, within the casing 60, a valve member 62 which is movable between first position in which the first conduit means 28 is closed and second position in which the second conduit means 34 is closed and is biased toward the first position by a spring 64 and power means for moving the valve member 62 toward the second position against the bias of the spring 64. The power means includes a solenoid 66 and urges the valve member 62 toward its second position when the solenoid 66 is energized.

The first stage bleed valve 46 is fluidly disposed in the second conduit means 34 and the third conduit means 38 between the first three-way valve 42, the relatively large bleed port 36 and the second stage bleed valve 48. The first stage bleed valve 46 has a casing 68 which forms part of the second conduit means 34 and the third conduit means 38 and includes, within the casing 68, a valve member 70 which is movable between first position in which the second conduit means 34 is closed and a second position in which the third conduit means 38 is closed and is biased toward the first position by a spring 72 and power means for moving the valve member 70 toward the second position against the bias of the spring 72 when the solenoid 74 is energized.

The valve operating solenoid 66 is electrically connected in series with an accelerator-operated breaker switch 76 and a grounded battery 78. When the accelerator-operated breaker switch 76 is closed, that is when the accelerator 44 is released, the valve-operating solenoid 66 is energized to effect the clutch disengaging operation of the motor unit 12. In this condition the first conduit means 28 is opened to apply the vacuum in the source of vacuum 32 to the suction chamber 30 to let the power element 10 to assume a leftwardly limit position, the position illustrated in FIG. 1. The source vacuum 32 is connected to the engine intake manifold through an one-way valve 80 so that the vacuum is present in the source of vacuum 32 at all times.

The valve-operating solenoid 74 is electrically connected in series with a motor unit operated breaker switch 82 and the grounded battery 78. When the motor unit operated breaker switch 82 is closed, the second conduit means 34 is opened to the ambient air through the relatively large bleed port 36.

As the accelerator 44 is depressed, the switch 76 is opened to deenergize the solenoid 66 to allow the spring 64 to bias the valve member 62 to close the source of vacuum conduit and to open the second conduit means 34, thus connecting the suction chamber 30 to the relatively large bleed port 36. As a result, the power element 10 begins to move from the illustrated position rightwardly, as viewed in FIG. 1, to cause the driven clutch member to move toward the driving clutch member.

During this movement of the power element 10, the breaker switch 82 is opened by a shaft 84. The shaft 84 is slidably mounted to the cup casing casing 12b and is connected to the power element 10 to be movable therewith. The switch 82 is secured to the casing 12b by a bracket in such a manner that movement of the piston 84 rightwardly beyond an intermediate position between its leftward limit position, the position illustrated in FIG. 1, and its rightward limit position, the position shown in dash and dot lines in FIG. 1, will cause the switch 82 to be opened. The switch 82 is preferably opened at the so-called cushion point of the clutch plates, that is the position of the movable driven clutch plate when it is in slight contact with the driving clutch plate, and remains opened unit such time as the driven clutch plate firmly engages with the driving clutch plate.

When the switch 82 is opened, the valve operating solenoid 74 is deenergized to allow the spring 72 to move the valve member 70 to close the relatively large bleed port 36, thus establishing a fluid connection between the suction chamber 30 and the relatively small bleed port 40 through the first conduit means 28, the second conduit means 34, the third conduit means 38 and the second stage bleed valve 48.

Describing now the operation of the valvular unit 26 and the switches 76 and 82, when the accelerator 44 is released the switch 76 is closed to energize the valve operating solenoid 66, thus causing the valve 42 to permit the vacuum to be applied to the suction chamber 30 from the source of vacuum 32. The application of the vacuum to the suction chamber 30 will cause the power element 10 and the piston 84 to assume the position illustrated in FIG. 1, and the clutch plates are disengaged. The switch 82 is closed when the piston 84 is in the position illustrated in FIG. 1, the energizing the valve-operating solenoid 74. The energization of the solenoid will cause the valve member 70 to open the relatively large bleed port 36. The valve member 52 repeatedly close and open the relatively small bleed port 40 in response a signal pulse supplied to the solenoid 56.

When the switch 76 is opened, that is when the accelerator 44 is depressed from its released position, the valve operating solenoid 66 is deenergized to allow the valve member 62 to close the first conduit means 28 and open the second conduit means 34. Then the vacuum existing in the suction chamber 30 begins to be relieved. The rate of relieving of the vacuum is determined by the size of the relatively large bleed port 36. As the vacuum level in the suction chamber 30 lowers, the power element 10 and the piston 84 move rightwardly from the illustrated position at a relatively fast rate that is determined in accordance with the rate of relieving of the vacuum in the suction chamber 30. When the piston 84 comes to the predetermined intermediate position, it operates the switch 82 to be opened, thus deenergizing the solenoid 74 of the three-way valve 46. The deenergization of the solenoid 74 will allow the valve member 70 to be moved to a position in which the relatively large bleed port 36 is closed and fluid connection between the second and third conduit means 34 and 38 is achieved, thus air is bleeded through the relatively small bleed port 40.

Figure 5:
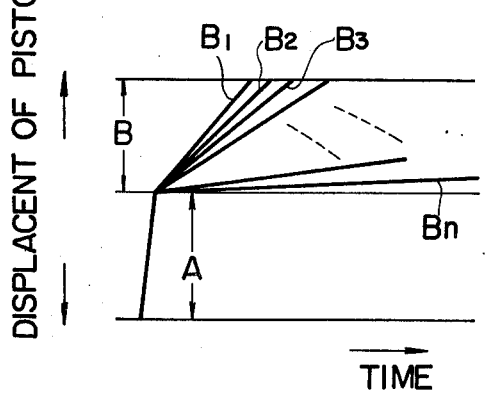
FIG. 5 is a diagram of a relatively fast movement of a clutch actuating piston of the clutch control pressure differential operated motor during the relatively fast movement of the driven clutch member as it moves towards the driving clutch member and until the driven clutch member contacts the driving clutch member at a predetermined load and of a relatively small movement of the clutch actuating piston during the relatively small movement of the driven member as it moves into firmer engagement with the driving member.

As will be understood from the preceding explanation, a relatively fast movement of the driven clutch member as it moves towards the driving clutch member and until the driven clutch member contacts the driving clutch member at a predetermined load is realized when the suction chamber 30 is connected to the relatively large bleed port 36; and a relatively small movement of the driven clutch member as it moves into firmer engagement with the driving clutch member is realized when the suction chamber 30 is connected to the relatively small bleed port 40. The graph shown in FIG. 5 represent this character in terms of the rate of displacement of the piston 84 as it moves from the leftward limit position (illustrated by solid line in FIG. 1) to the rightward limit position (illustrated by dash and dot lines in FIG. 1).

Referring now particularly to FIGS. 2 through 5, the pulse width modulator 58 is described in detail. It includes a triangular wave (voltage wave) generator 88. The output (see $a$ in FIG. 3) is fed to negative terminal 90$a$ of an operating amplifier 90. To positive terminal 90$b$ of the operating amplifier 90, a voltage (see $b$) at a junction 92 intermediate resistors 94 and 96 is fed. A junction 98 intermediate the resistors 96 and 100 is connected to an output of an inverter 102. A junction 104 intermediate the resistors 100 and 106 is connected to an output of an inverter 108. A junction intermediate resistors 106 and 112 is connected to an output of an inverter 114. A junction 116 intermediate resistors 112 and 118 is connected to an inverter 120. An output signal voltage (see $c$ in FIG. 3) of the operating amplifier 90 is inverted by an inverter 122 and an inverted signal pulse (see $d$ in FIG. 3, ref. FIG. 1 also) is applied to the base of a switching transistor 124, the emitter collector circuit of which including the valve operating solenoid 56 of the valve 48 (see FIG. 1).

Let it be assumed that logical "1" signal is applied to an input of the inverter 102 by connecting the input of the inverter 102 with a suitable source of logical "1", not shown. The output of the inverter 102 becomes logical "0" and the terminal 98 becomes the ground potential. Then the reference voltage at the junction 92 is determined by the resistors 94 and 96 only because the junction is grounded. The operating amplifier 90 will process a triangular voltage wave $a$ (see FIG. 3) from the generator 88 and reference voltage $b$ at the junction 92 and provide a signal pulse $c$ at its output. This signal pulse $c$ is inverted into a signal pulse $d$. Conduction of the transistor 124 is controlled by the signal pulse $d$.

The magnitude of the reference voltage can be altered by imposing logical "1" signal selectively on one of the inverters 108, 114 and 120 from the source of logical "1". If the logical "1" signal is applied to the input of the inverter 108, the reference voltage at the junction 92 will be determined by the resistors 94, 96 and 100 and becomes low. Lowering the reference voltage will shorten the pulse width of the pulse signal $d$.

Figure 4:
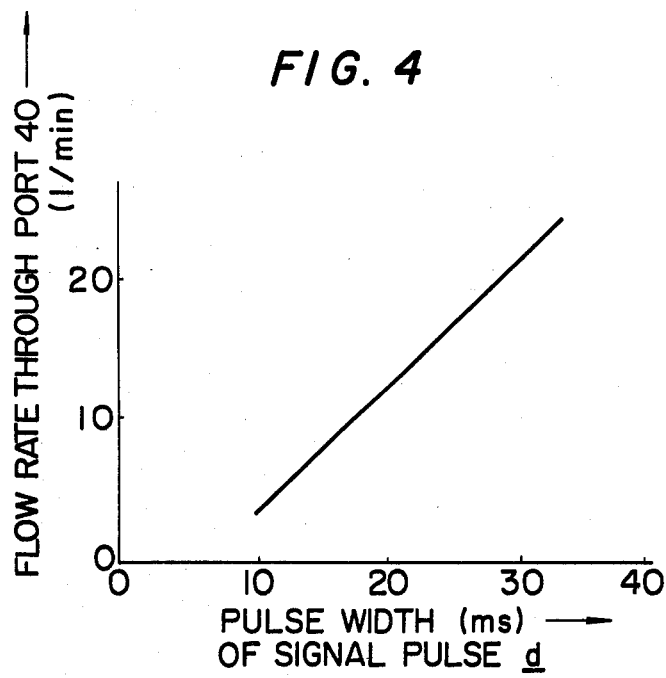
FIG. 4 is a graph showing the relation between the flow rate through a relatively small air bleed port against the pulse width of the signal pulse supplied to the repeatedly closing and opening valve means.

As shown in FIG. 4, increasing the pulse width will result in an increase of the flow rate through the bleed port 40 of the bleed valve 48.

It will now be appreciated that selectively applying a logical "1" signal only one of the inverters 102, 108, 114 and 120 will make possible any desired rate of movement of the driven clutch member after the cushion point with respect to the time as represented by $B_1$, $B_2$, ...$B_n$, shown in FIG. 5.

What is claimed is:

1. Control means for automotive vehicle comprising a clutch control pressure differential operated motor; a source of vacuum; first means fluidly connecting the motor to the source of vacuum; second means fluidly connecting first fluidly connecting means to a relatively large air bleed port; third means for fluidly connecting the second fluidly connecting means to a relatively small air bleed port; valve means for repeatedly closing and opening the relatively small air bleed port; a first three-way valve means disposed in the first and second fluidly connecting means intermediate the motor and the source of vacuum for connecting the motor only to the source of vacuum when the accelerator is completely released to effect a clutch disengaging operation of the motor and for connecting the motor only to the second fluidly connecting means when the accelerator is depressed to effect a clutch engaging operation of the motor; and a second three-way valve means disposed in the second and third fluidly connecting means intermediate the first three-way valve means, the relatively large air bleed port and the repeatedly closing and opening valve means for connecting the second fluidly connecting means only to the relatively large air bleed port to realize a relatively fast movement of the driven clutch member as it moves towards the driving clutch member and until the driven member contacts the driving member at a predetermined load and for connecting the second fluidly connecting means only to the repeatedly closing and opening valve means to effect a relatively small movement of the driven member as it moves into firmer engagement with the driving member.

2. Control means as claimed in claim 1, in which the repeatedly closing and opening valve means includes a solenoid opening the valve means when energized and means provided for supplying a signal pulse to the solenoid to energize the same.

3. Control means as claimed in claim 2, in which a signal pulse supplying means includes a pulse width modulator to vary the pulse width of the signal pulse.

4. Control means as claimed in claim 1, in which a switch controlled by the motor is provided to operate the second three-way valve means.

5. Control means as claimed in claim 4, in which a switch controlled by the accelerator is provided to operate the first three-way valve means.

* * * * *